(12) United States Patent
Takai

(10) Patent No.: US 9,139,221 B2
(45) Date of Patent: Sep. 22, 2015

(54) METHOD OF PRODUCING RACK OF ELECTRIC POWER STEERING DEVICE

(71) Applicant: HITACHI AUTOMOTIVE SYSTEMS STEERING, LTD., Hiki-gun, Saitama (JP)

(72) Inventor: Yoshiki Takai, Atsugi (JP)

(73) Assignee: HITACHI AUTOMOTIVE SYSTEMS STEERING, LTD., Saitama (JP)

( * ) Notice: Subject to any disclaimer, the term of this patent is extended or adjusted under 35 U.S.C. 154(b) by 12 days.

(21) Appl. No.: 13/854,619

(22) Filed: Apr. 1, 2013

(65) Prior Publication Data
US 2014/0060956 A1 Mar. 6, 2014

(30) Foreign Application Priority Data
Aug. 31, 2012 (JP) .................................. 2012-191074

(51) Int. Cl.
| | |
|---|---|
| *B62D 5/04* | (2006.01) |
| *B62D 3/12* | (2006.01) |
| *B23K 20/12* | (2006.01) |
| *F16H 55/26* | (2006.01) |
| *B23K 20/227* | (2006.01) |

(52) U.S. Cl.
CPC .............. *B62D 5/0442* (2013.01); *B23K 20/12* (2013.01); *B23K 20/2275* (2013.01); *B62D 3/126* (2013.01); *F16H 55/26* (2013.01); *B23K 2203/04* (2013.01); *B23K 2203/20* (2013.01); *Y10T 29/49826* (2015.01); *Y10T 74/18096* (2015.01)

(58) Field of Classification Search
CPC ...... B62D 5/0442; B62D 3/126; B23K 20/12; B23K 20/2275; F16H 55/26
USPC .......................... 180/443, 444; 74/30; 29/428
See application file for complete search history.

(56) References Cited

U.S. PATENT DOCUMENTS

| | | | |
|---|---|---|---|
| 6,925,899 B2 * | 8/2005 | Ozeki | .............................. 74/422 |
| 2007/0057479 A1 * | 3/2007 | Wolf et al. | ................ 280/93.514 |
| 2012/0160595 A1 * | 6/2012 | Fujitomi et al. | ............... 180/443 |

FOREIGN PATENT DOCUMENTS

JP          2002-154442 A          5/2002

* cited by examiner

*Primary Examiner* — Joseph Rocca
*Assistant Examiner* — Jacob Knutson
(74) *Attorney, Agent, or Firm* — Foley & Lardner LLP

(57) ABSTRACT

A method of producing a rack is proposed, which comprises aligning a first bar piece, an intermediate piece and a second bar piece in order along a common axis; carrying out a first process in which the first and second bar pieces are stationarily held while showing a predetermined intersection angle between the first rack teeth on the first bar piece and the second rack teeth on the second bar piece; and carrying out a second process in which each of the first and second bar pieces and the intermediate piece are brought into contact with each other at mutually facing ends and subjected to a relative rotation therebetween for a friction welding thereby to join the first bar piece, the intermediate piece and the second bar piece together by the friction welding.

12 Claims, 14 Drawing Sheets

METHOD OF PRODUCING RACK OF ELECTRIC POWER STEERING DEVICE

BACKGROUND OF THE INVENTION

1. Field of the Invention

The present invention relates in general to a method of producing racks used in electric power steering devices, and more particularly to the method of producing the racks of a type that is meshed with both a first pinion driven by a steering wheel system and a second pinion driven by a power assisting system thereby to take part in transmitting both a steering force from a driver and an assisting force from the assisting system.

2. Description of the Related Art

One of the methods of producing racks of the electric power steering device is disclosed in Japanese Laid-open Patent Application (tokkai) 2002-154442.

The disclosed method is as follows. First, an elongate bar is prepared and the elongate bar is subjected to a hot working to form, on axially opposed portions of the bar, first rack teeth for the first pinion and second rack teeth for the second pinion respectively. Then, the first rack teeth are subjected to a cutting work. With this cutting work, undesired axial misregistration of the first rack teeth relative to the second rack teeth, which would be caused by a thermal strain produced in the first rack teeth at the time of formation of the first and second rack teeth by the hot working, is eliminated and corrected.

SUMMARY OF THE INVENTION

However, in the above-mentioned known method, the cutting work is used as an additional work, which causes a complicated and time-consuming production process for the rack.

The present invention is provided by taking the above-mentioned drawback of the conventional rack production method into consideration and aims to provide a method of producing a rack, which is free of the above-mentioned drawback.

That is, in accordance with the present invention, there is provided a method of producing a rack, which can easily produce a precision rack without usage of a complicated and time-consuming production process.

In accordance with the present invention, there are further provided a rack that is produced through the method of the invention and an electric power steering device that employs therein the rack produced through the method of the invention.

In accordance with a first aspect of the present invention, there is provided a method of producing a rack for use in an electric power steering device of a vehicle, which comprises preparing a first bar piece (31) that has first rack teeth (R1) adapted to be meshed with a first pinion (P1) directly driven by a steering wheel, a second bar piece (32) that has second rack teeth (R2) adapted to be meshed with a second pinion (P2) driven by a steering assist electric motor (M) and an intermediate piece (33, 33') that has one end to be welded to the first bar piece (31) and the other end to be welded to the second bar piece (32); aligning the first bar piece (31), the intermediate piece (33) and the second bar piece (32) in order along a common axis (Z); carrying out a first process in which the first and second bar pieces (31, 32) are stationarily held while showing a predetermined intersection angle (θ) between the first rack teeth (R1) on the first bar piece (31) and the second rack teeth (R2) on the second bar piece (32); and carrying out a second process in which each of the first and second bar pieces (31, 32) and the intermediate piece (33, 33') are brought into contact with each other at mutually facing ends and subjected to a relative rotation therebetween for a friction welding thereby to join the first bar piece (31), the intermediate piece (33, 33') and the second bar piece (32) together by the friction welding.

In accordance with a second aspect of the present invention, there is provided a rack for transmitting a steering operation of a steering wheel to steered road wheels of a vehicle, which comprises a first bar piece (31) that has first rack teeth (R1) adapted to be meshed with a first pinion (P1) directly driven by the steering wheel; a second bar piece (32) that has second rack teeth (R2) adapted to be meshed with a second pinion (P2) driven by a steering assist electric motor (M) and; an intermediate piece (33, 33') that has one end to be secured to the first bar piece (31) and the other end to be secured to the second bar piece (32), in which the rack is produced through the following steps: aligning the first bar piece (31), the intermediate piece (33) and the second bar piece (32) in order along a common axis (Z); carrying out a first process in which the first and second bar pieces (31, 32) are stationarily held while showing a predetermined intersection angle "θ" between the first rack teeth (R1) on the first bar piece (31) and the second rack teeth (R2) on the second bar piece (32); and carrying out a second process in which each of the first and second bar pieces (31, 32) and the intermediate piece (33, 33') are brought into contact with each other at mutually facing ends and subjected to a relative rotation for a friction welding thereby to join the first bar piece (31), the intermediate piece (33, 33') and the second bar piece (32) together by the friction welding.

In accordance with a third aspect of the present invention, there is provided a rack for transmitting a steering operation to steered road wheels of a vehicle, which comprises a first bar piece (31) that has first rack teeth (R1) adapted to be meshed with a first pinion (P1) directly driven by a steering wheel; a second bar piece (32) that has second rack teeth (R2) adapted to be meshed with a second pinion (P2) driven by a steering assist electric motor (M); and an intermediate piece (33, 33') that has one end welded to the first bar piece (31) and the other end welded to the second bar piece (32).

In accordance with a fourth aspect of the present invention, there is provided an electric power steering device which comprises a first pinion (P1) directly driven by a steering wheel; an electric motor (M) for producing a steering assist power; a second pinion (P2) driven by the steering assist power; a rack (1, 1') including a first bar piece (31) having first rack teeth (R1) meshed with the first pinion (P1), a second bar piece (32) having second rack teeth (R2) meshed with the second pinion (P2) and an intermediate piece (33) having one end secured to the first bar piece (31) and the other end secured to the second bar piece (32), so that the rack is axially moved to transmit the power from the steering wheel and the electric motor (M) to steered road wheels; in which the rack is produced through the following steps: aligning the first bar piece (31), the intermediate piece (33) and the second bar piece (32) in order along a common axis (Z); carrying out a first process in which the first and second bar pieces (31, 32) are stationarily held while showing a predetermined intersection angle "θ" between the first rack teeth (R1) on the first bar piece (31) and the second rack teeth (R2) on the second bar piece (32); and carrying out a second process in which each of the first and second bar pieces (31, 32) and the intermediate piece (33, 33') are brought into contact with each other at mutually facing ends and subjected to a relative rotation for a friction welding thereby to join the first bar piece (31), the intermediate piece (33, 33') and the second bar piece (32) together by the friction welding.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, a method of producing a rack according to the present invention will be described in detail with reference to the accompanying drawings.

Referring to FIGS. 1 to 15, there is shown a method of producing a rack, which is a first embodiment of the present invention.

For ease of description, before explaining the method of producing the rack, the description will be commenced with respect to an electric power steering device of dual pinion type that practically uses therein the rack.

Furthermore, for ease of description, various directional terms, such as, right, left, upper, lower, upwardly and the like are used in the following description. However, such terms are to be understood with respect to only drawing or drawings on which a corresponding element or portion is shown.

Figure 1:
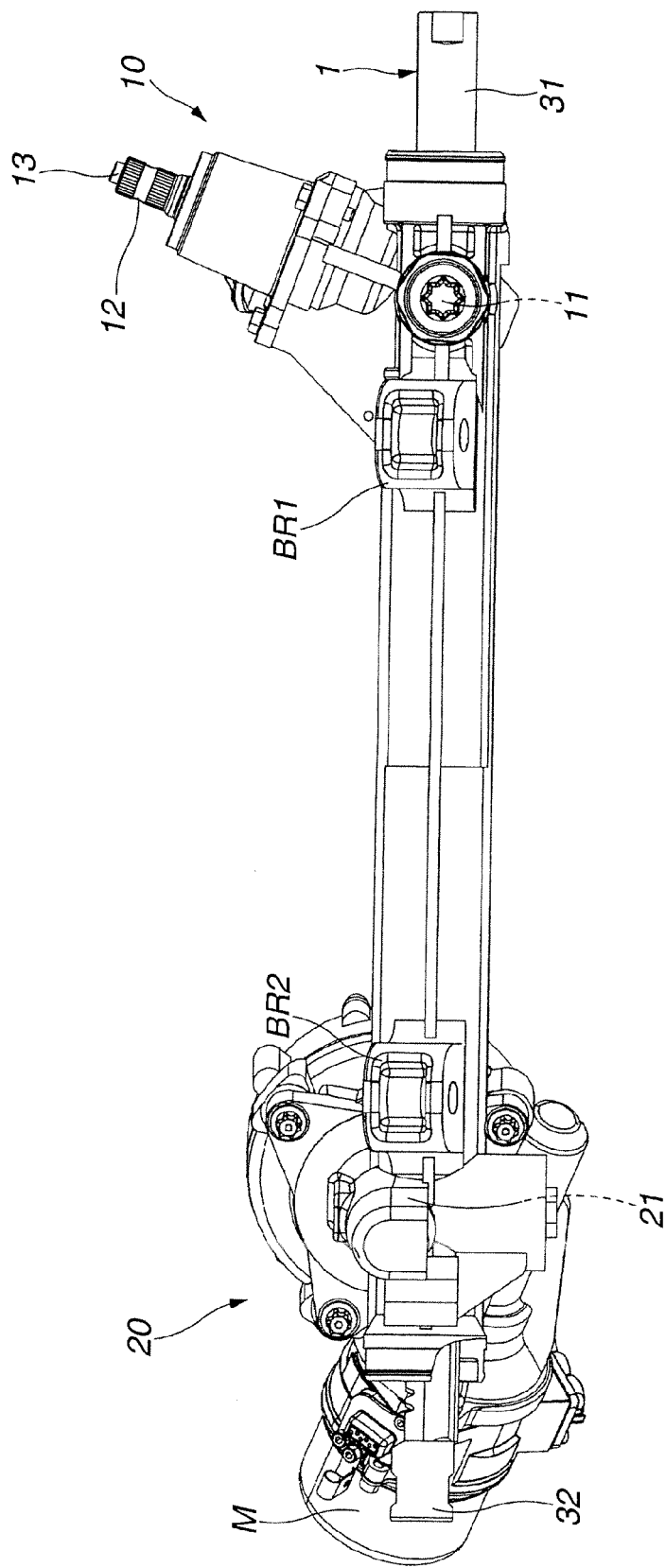
FIG. 1 is a front view of an electric power steering device that practically employs therein a rack produced through the method of the present invention.

In FIG. 1, there is shown the electric power steering device that employs therein the rack produced through the method of the present invention.

The electric power steering device shown generally comprises a steering system constituting section 10 that is connected to a steering wheel (not shown) to transmit a steering force of a driver to steered road wheels (not shown) of an associated motor vehicle and an assist system constituting section 20 that is connected to an electric motor M to transmit a steering assist force produced by electric motor M to the steered road wheels.

As will be understood from FIG. 1, the electric power steering device is tightly mounted to a vehicle body (not shown) through first and second brackets BR1 and BR2 mounted on the device.

As is seen from FIGS. 1 to 4, the electric power steering device further comprises a first rack-and-pinion mechanism 11 that is connected to the steering wheel and a second rack-and-pinion mechanism 21 that is connected to the electric motor M.

Figure 2:
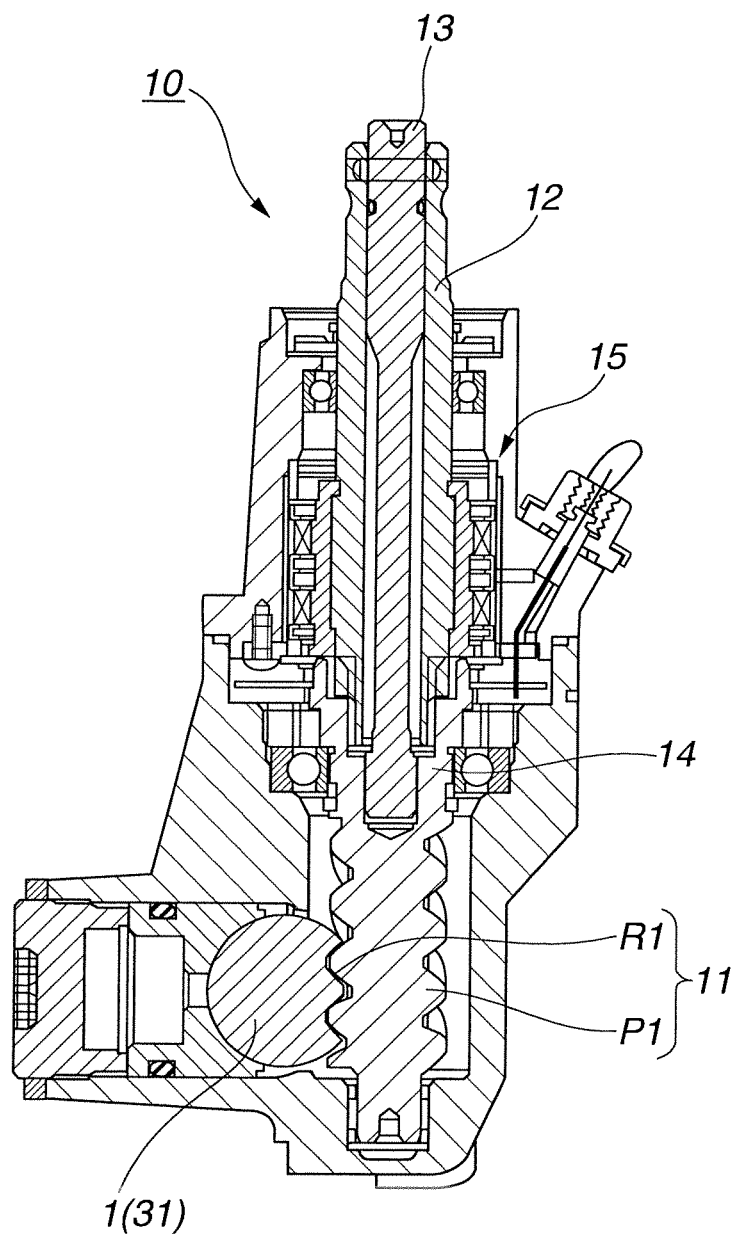
FIG. 2 is a vertically sectional view of one part of the electric power steering device of FIG. 1, where a steering system constituting section is provided.
Figure 4:
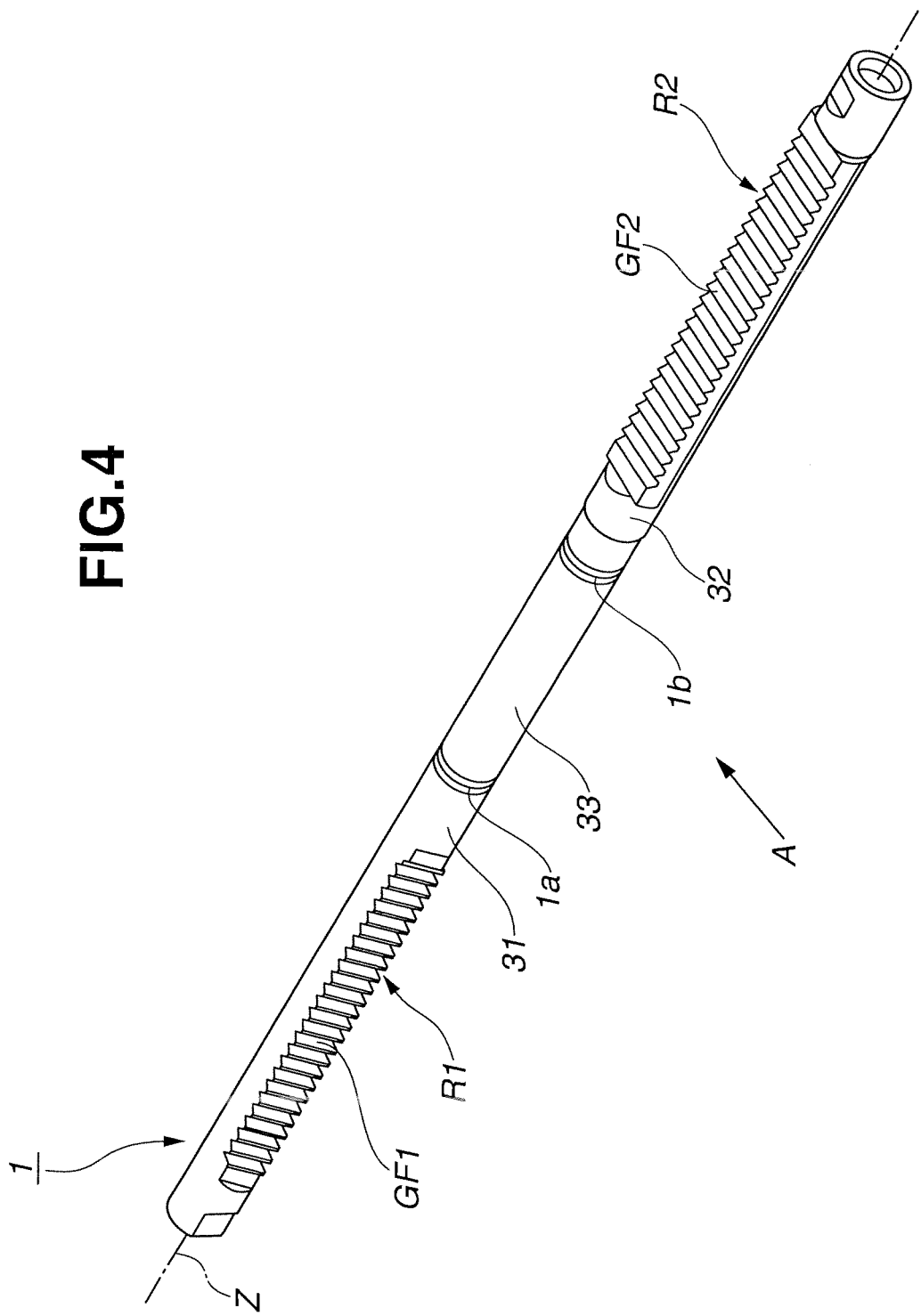
FIG. 4 is a perspective view of the rack produced through the method of the present invention.

As is seen from FIGS. 2 and 4, the first rack-and-pinion mechanism 11 comprises a first pinion P1 driven by the steering wheel (not shown) and first rack teeth R1 formed on the left half of the rack 1 (see FIG. 4) and meshed with first pinion P1, and the second rack-and-pinion mechanism 12 comprises a second pinion P2 driven by the electric motor M and second rack teeth R2 formed on the right half of the rack 1 (see FIG. 4) and meshed with second pinion P2. That is, the steering force produced by the driver and the steering assist force produced by electric motor M are both transmitted to the steered road wheels through the rack 1.

More specifically, as is seen from FIG. 2, steering system constituting section 10 comprises mainly an input shaft 12 that has one end connected to the steering wheel to effect an integral rotation together with the steering wheel, a first output shaft 14 (or first pinion P1) that has one end pivotally connected through a torsion bar 13 to the other end of input shaft 12 and the other end connected through the first rack-and-pinion mechanism 11 to the steered road wheels, and a torque sensor 15 that is arranged around input shaft 12 to detect a steering input torque. Thus, in response to rotation of first output shaft 14, rack 1 is urged to move axially in one or the other direction. Both ends of rack are linked to the steered road wheels, so that the axial movement of rack 1 induces a steering movement of the steered road wheels of the vehicle.

Figure 3:
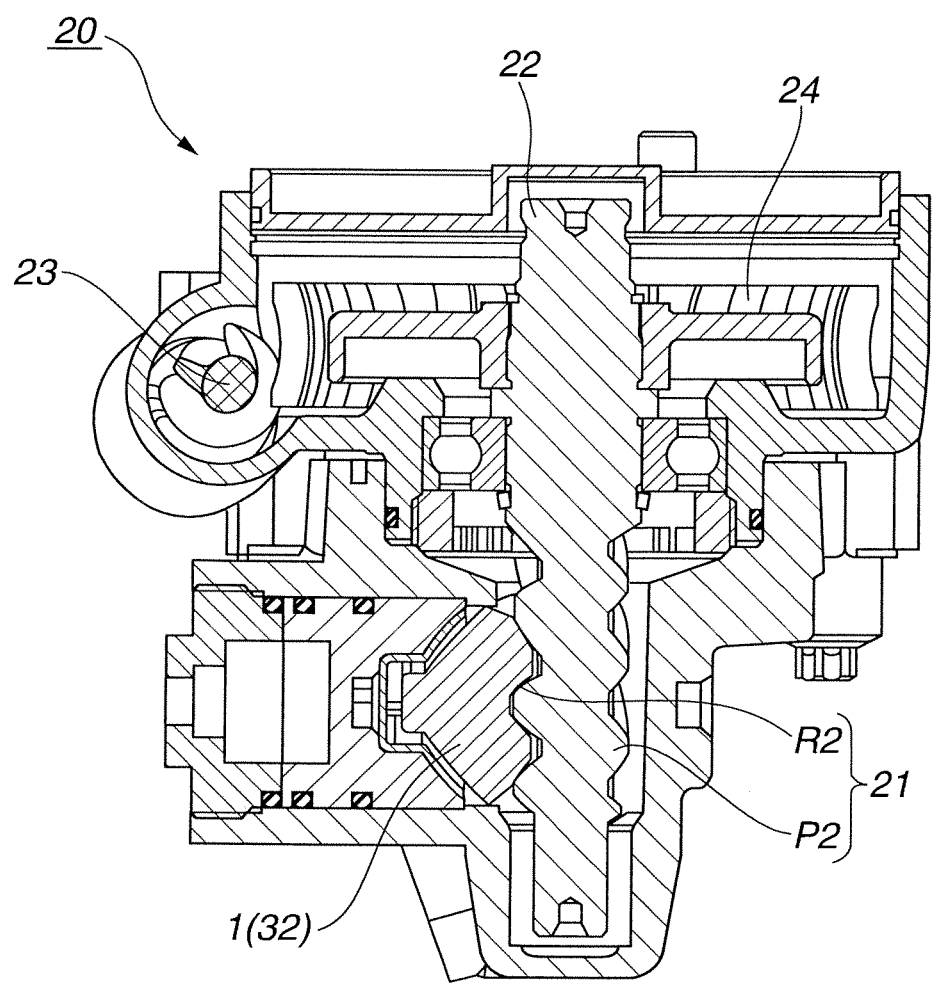
FIG. 3 is a vertically sectional view of the other part of the electric power steering device of FIG. 1, where an assist system constituting section is provided.

As is seen from FIG. 3, assist system constituting section 20 comprises mainly the electric motor M that generates a steering assist force in accordance with the steering force of the driver and a second output shaft 22 (or second pinion P2) that has one end connected through a speed reduction device to an output shaft of electric motor M and the other end connected through the second rack-and-pinion mechanism 21 to the steered road wheels. The speed reduction device comprises a warm shaft 23 connected to the output shaft of electric motor M and a warm wheel 24 that is tightly mounted on second output shaft 22 and operatively engaged with warm shaft 23.

As is seen from FIGS. 3 and 4, the second rack-and-pinion mechanism 21 comprises second pinion P2 that is formed on a leading portion of second output shaft 22 and second rack teeth R2 (see FIG. 7) that are formed on the right half of rack 1. Thus, like in the above-mentioned first rack-and-pinion mechanism 11, in response to rotation of second output shaft 22, rack 1 is urged to move axially in one or other direction. Under this movement of rack 1, the assist force produced by electric motor M is controlled by various control factors which are, for example, the steering input torque detected by torque sensor 15, a vehicle speed detected by a vehicle speed sensor mounted to the road wheel, etc. With this control, a suitable assist force is produced by electric motor M and transmitted to the steered road wheels.

Figure 5:
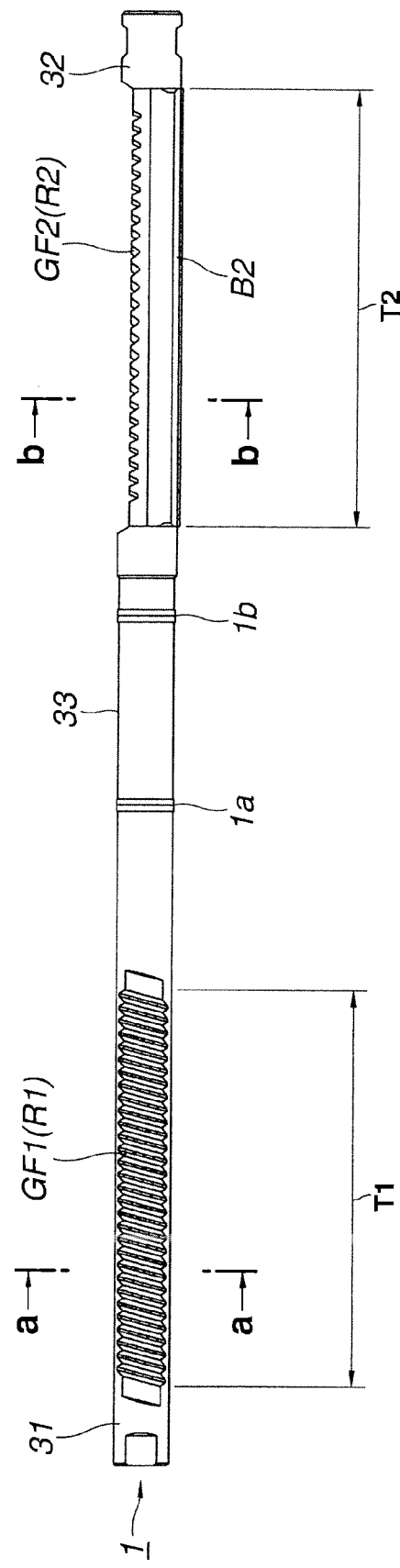
FIG. 5 is a plan view of the rack, which is taken from a direction of the arrow "A" of FIG. 4.

As is seen from FIGS. 4 and 5, the rack 1 consists of three bar pieces 31, 33 and 32 that are aligned and joined together. More specifically, rack 1 consists of a first bar piece 31 that is formed with first rack teeth R1, a second bar piece 32 that is formed with second rack teeth R2 and an intermediate bar piece 33 that is coaxially disposed between first and second bar pieces 31 and 32. These three bar pieces 31, 32 and 33 are jointed together through a friction welding as will be described in detail hereinafter.

Figure 8:
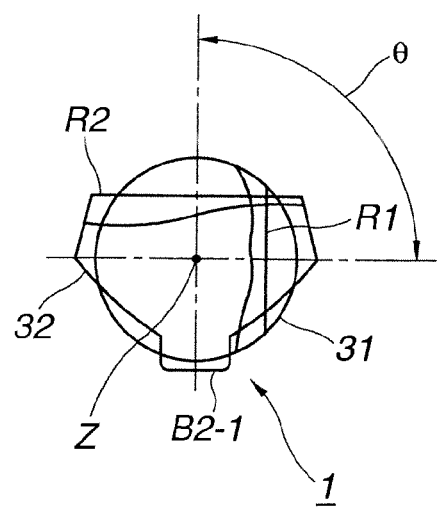
FIG. 8 is a rough sketch showing a relative angular displacement (or phase difference) between a first bar piece and a second bar piece.

As is seen from FIGS. 4, 5 and 8, first and second bar pieces 31 and 32 are angled by a given angle "θ". In the illustrated embodiment, the given angle "θ" is 90 degrees, as is seen from FIG. 8.

Figure 6:
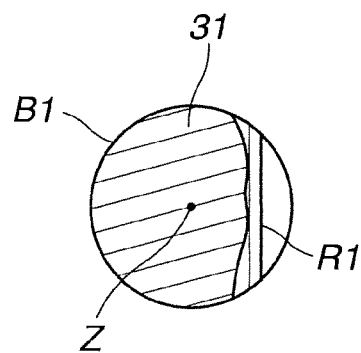
FIG. 6 is an enlarged sectional view taken along the line "a-a" of FIG. 5.

As is seen from FIGS. 4 and 6, first bar piece 31 is a m cylindrical rod of untempered steel, such as carbon steel or the like and has within a given axial range thereof first rack teeth R1 that are forged. That is, first bar piece 31 has a circular cross section at axially opposed end portions where first rack teeth R1 are not formed.

More specifically, as is seen from FIGS. 4, 5 and 6, a first rack teeth forming portion T1 is constructed by first rack teeth R1 and a semicylindrical portion B1 (see FIG. 6) provided at the back of first rack teeth R1.

As will be described in detail hereinafter, first rack teeth forming portion T1 receives a steering force (or torque) from a driver. The steering force from the driver is small as compared with a steering assist force produced by electric motor M. Thus, as is seen from FIG. 4, first rack teeth R1 are small in tooth size as compared with second rack teeth R2 of an after-mentioned second rack teeth forming portion T2 that receives the steering assist force of electric motor M. Accordingly, first rack teeth forming portion T1 can be made simpler than the after-mentioned second rack teeth forming portion T2.

As is seen from FIGS. 4 and 5, a cylindrical right end of first bar piece 31 is welded to a cylindrical left end of intermediate bar piece 33. The welded portion is designated by reference 1a. As shown, cylindrical right end of first bar piece 31 and cylindrical left end of intermediate bar piece 33 are the same in diameter and thus, the two bar pieces 31 and 33 are suppressed from having an ugly gap therebetween at the welded portion 1a.

Figure 10:
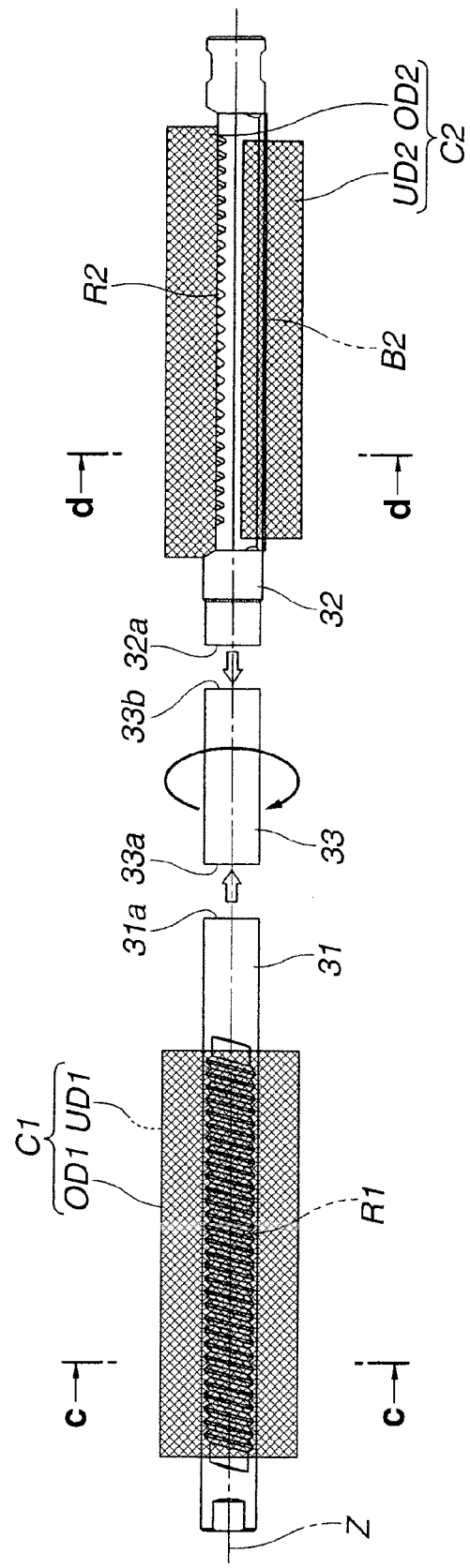
FIG. 10 is a rough sketch showing a condition in which the first and second bar pieces are held by first and second chucks respectively at both sides of an intermediate bar piece.
Figure 11:
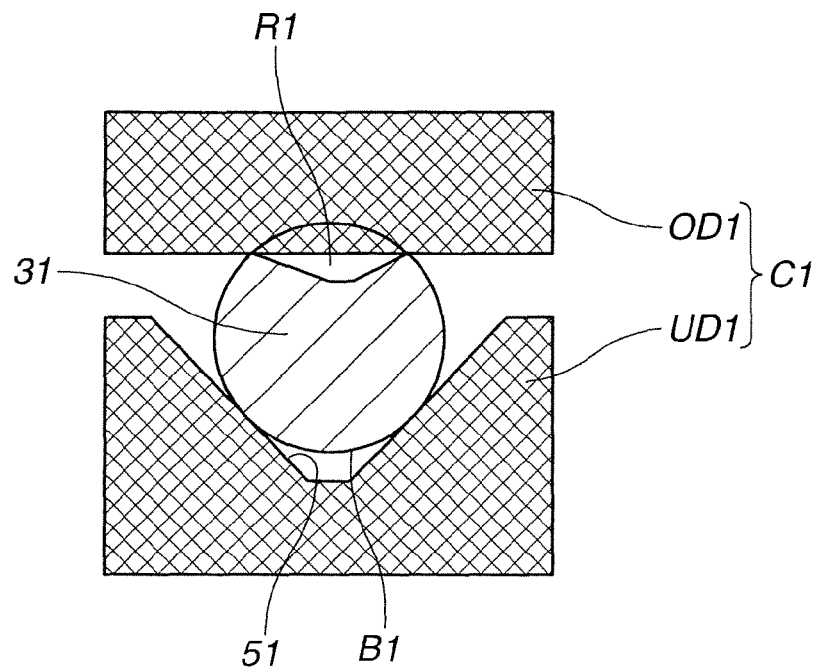
FIG. 11 is an enlarged sectional view taken along the line "c-c" of FIG. 10.
Figure 12:
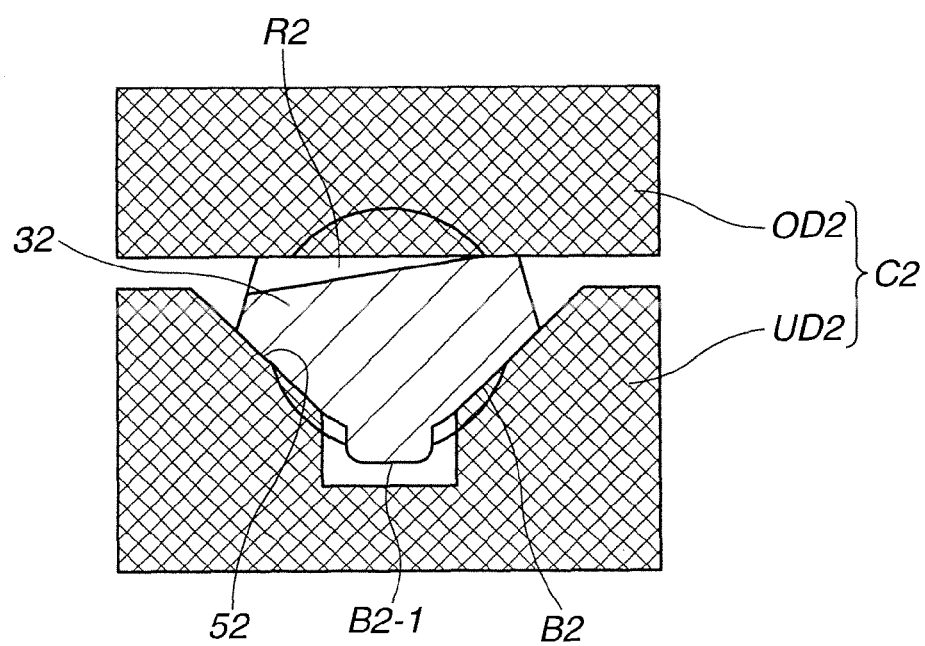
FIG. 12 is an enlarged sectional view taken along the line "d-d" of FIG. 10.
Figure 13:
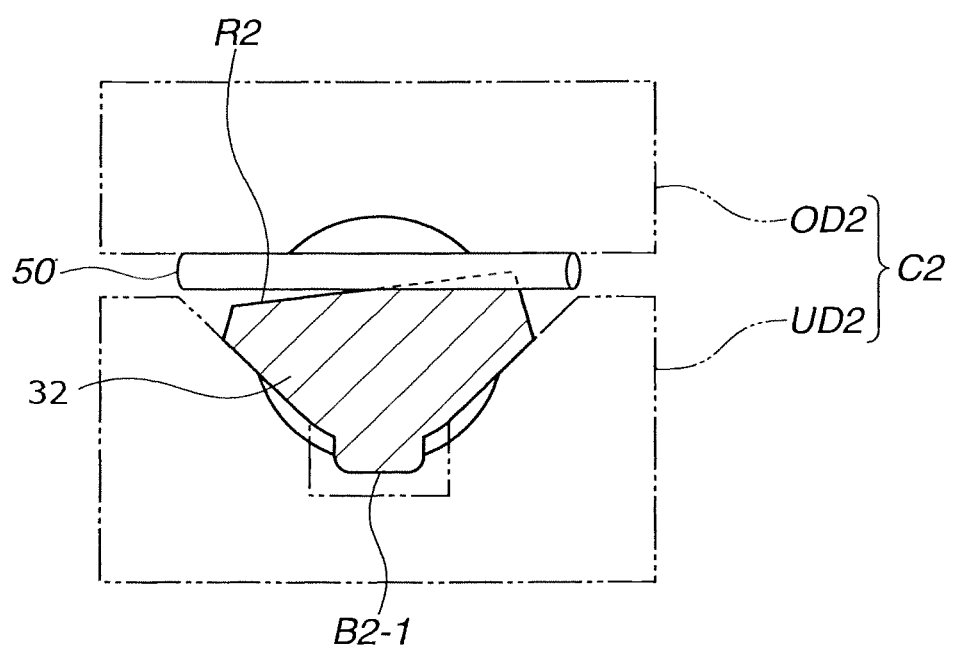
FIG. 13 is a rough sketch showing a condition in which the second bar piece is held and positioned by the second chuck with the aid of positioning pins.
Figure 14:
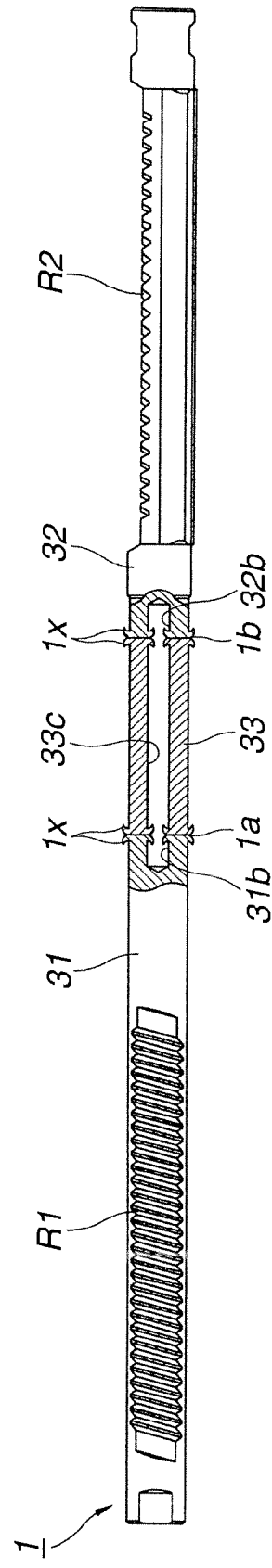
FIG. 14 is a partially sectional plan view of the rack showing a condition in which the first and second bar pieces and the intermediate bar piece are just joined by a friction welding.

As is shown in FIG. 10, a circular right end face of first bar piece 31 is denoted by reference 31a, and as is shown in FIG. 14, a right end portion of first bar piece 31 has a blind bore 31b.

Figure 7:
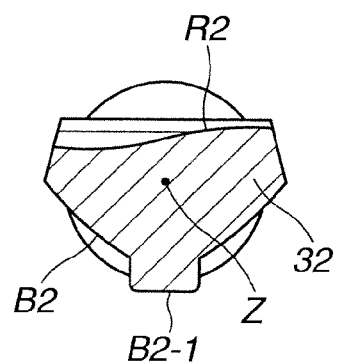
FIG. 7 is an enlarged sectional view taken along the line "b-b" of FIG. 5.

As is seen from FIGS. 4 and 7, the second bar piece 32 is a rod of untempered steel, such as carbon steel or the like and has within a given axial range thereof second rack teeth R2 that are forged. As shown, second rack teeth R2 are larger in size than the above-mentioned first rack teeth R1. Each tooth of second rack teeth R2 is also larger than that of first rack teeth R1.

More specifically, as is seen from FIG. 8, a lateral size of the given axial range of second bar piece 32 is larger than the diameter of first and intermediate bar pieces 31 and 33.

That is, as is seen form FIGS. 4, 5 and 7, a second rack teeth forming portion T2 is constructed by second rack teeth R2 and an elongate roof portion B2 (see FIG. 7) provided at the back of second rack teeth R2. Elongate roof portion B2 is formed with an axially extending ridge B2-1, and thus the given axial range of second bar piece 32 has a generally Y-shaped cross section as is seen from FIG. 7. As will be understood from FIG. 4, both ends of second bar piece 32 are cylindrical in shape.

As has been mentioned hereinabove, second rack teeth forming portion T2 receives the steering assist force produced by electric motor M. Thus, second rack teeth R2 are constructed to have a size larger than that of the above-mentioned first rack teeth R1. More specifically, second rack teeth R2 are so sized as to sufficiently withstand the larger steering assist force applied thereto from electric motor M. Accordingly, second rack teeth forming portion T2 is suppressed from having damages caused by strength poverty.

As is seen from FIGS. 4 and 5, a cylindrical left end of second bar piece 32 is welded to a cylindrical right end of intermediate bar piece 33. The welded portion is designated by reference 1b. As shown, cylindrical left end of second bar piece 32 and cylindrical right end of intermediate bar piece 33 are the same in diameter and thus, the two bar pieces 32 and 33 are suppressed from having an ugly gap therebetween at the welded portion 1b.

As is shown in FIG. 10, a circular left end face of second bar piece 32 is denoted by reference 32a, and as is shown in FIG. 14, a left end portion of second bar piece 32 has a blind bore 32b.

As will become apparent as the description proceeds, blind bore 31b of first bar piece 31 and the other blind bore 32b of second bar piece 32 are coaxially connected to a through bore 33c provided by intermediate bar piece 33 when these three bar pieces 31, 33 and 32 are properly joined via friction welding.

As is shown in FIG. 14, blind bores 31b and 32b and through bore 33c are the same in diameter.

As is described hereinabove, first and second bar pieces 31 and 32 are preferably made of untempered steel, such as carbon steel or the like. Due to usage of such untempered steel, the bar pieces 31 and 32 can stand a high heat produced under the friction welding, and thus, reduction in hardness of the pieces 31 and 32 is suppressed.

Figure 15:
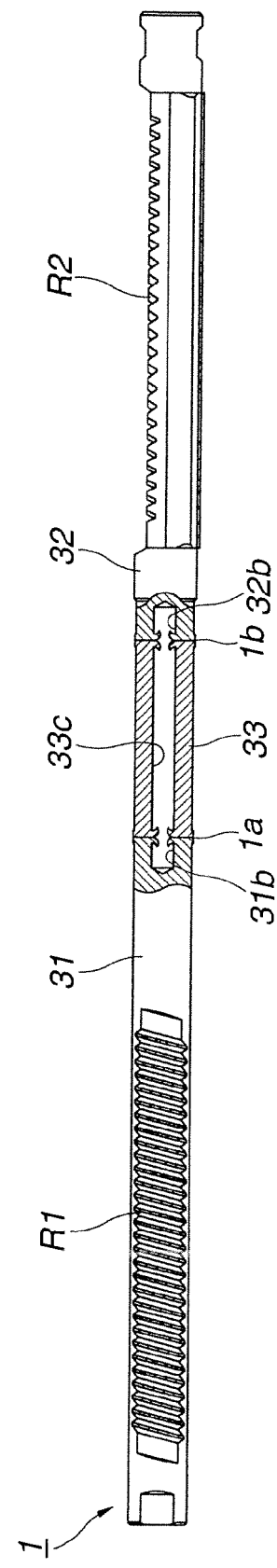
FIG. 15 is a view similar to FIG. 14, but showing a condition in which ugly burrs have been removed from the rack of FIG. 14.

As is seen from FIGS. 4 and 15, the intermediate bar piece 33 is a cylindrical rod of untempered steel, such as carbon steel or the like, like in the above-mentioned first and second bar pieces 31 and 32. If desired, intermediate bar piece 33 may be made of an aluminum alloy.

As is seen from FIG. 10, intermediate bar piece 33 has a circular left end face 33a that is to be welded to circular right end face 31a of first bar piece 31 and a circular right end face 33b that is to be welded to circular left end face 32a of second bar piece 32.

As is seen from FIG. 14, intermediate bar piece 33 is formed with the through bore 33c that extends axially. The through bore 33c and the above-mentioned blind bores 31b and 32b of first and second bar pieces 31 and 32 are same in diameter. Thus, as will be understood from FIG. 10, the four circular end faces 31a, 33a, 33b and 32a of the three bar pieces 31, 33 and 32 have the same contact area. With this, the high heat produced under the friction welding is equally and uniformly applied to the welded part 1a where the two end faces 31a and 33a contact and the other welded part 1b where the two end faces 33b and 32a contact. That is, poor welding between first and intermediate bar pieces 31 and 33 and between intermediate and second bar pieces 33 and 32 is suppressed.

As will be understood from FIG. 4, an imaginary elongate plane of first bar piece 31 on which first rack teeth R1 are formed is denoted by GF1 and an imaginary elongate plane of second bar piece 32 on which second rack teeth R2 are formed is denoted by GF2. These two imaginary elongate planes GF1 and GF2 extend along an axis "Z" of rack 1. Thus, in the illustrated embodiment, the two imaginary elongate planes GF1 and GF2 intersect each other at the angle "θ" (or 90 degrees).

As will be described in detail herein next, for producing the rack 1, first, intermediate and second bar pieces 31, 33 and 32 are aligned in order and first and second chucks C1 and C2 are used to hold first and second bar pieces 31 and 32 in a manner to contact these first and second bar pieces 31 and 32 to opposed ends 33a and 33b of intermediate bar piece 33 while causing these two bar pieces 31 and 32 to show an intersection angle "θ" (viz., 90 degrees) therebetween. Then, only intermediate bar piece 33 is rotated at a given high speed against the first and second bar pieces 31 and 32 to effect the friction welding of these three bar pieces 31, 33 and 32 at the contact portions. Each chuck C1 or C2 is of a split type. That is, first chuck C1 includes a pair jaw rods OD1 and UD1 and second chuck C2 includes a pair jaw rods OD2 and UD2.

In the following, the method of producing the rack 1 will be described in detail with reference to the drawings, particularly FIGS. 9 to 15.

Figure 9:
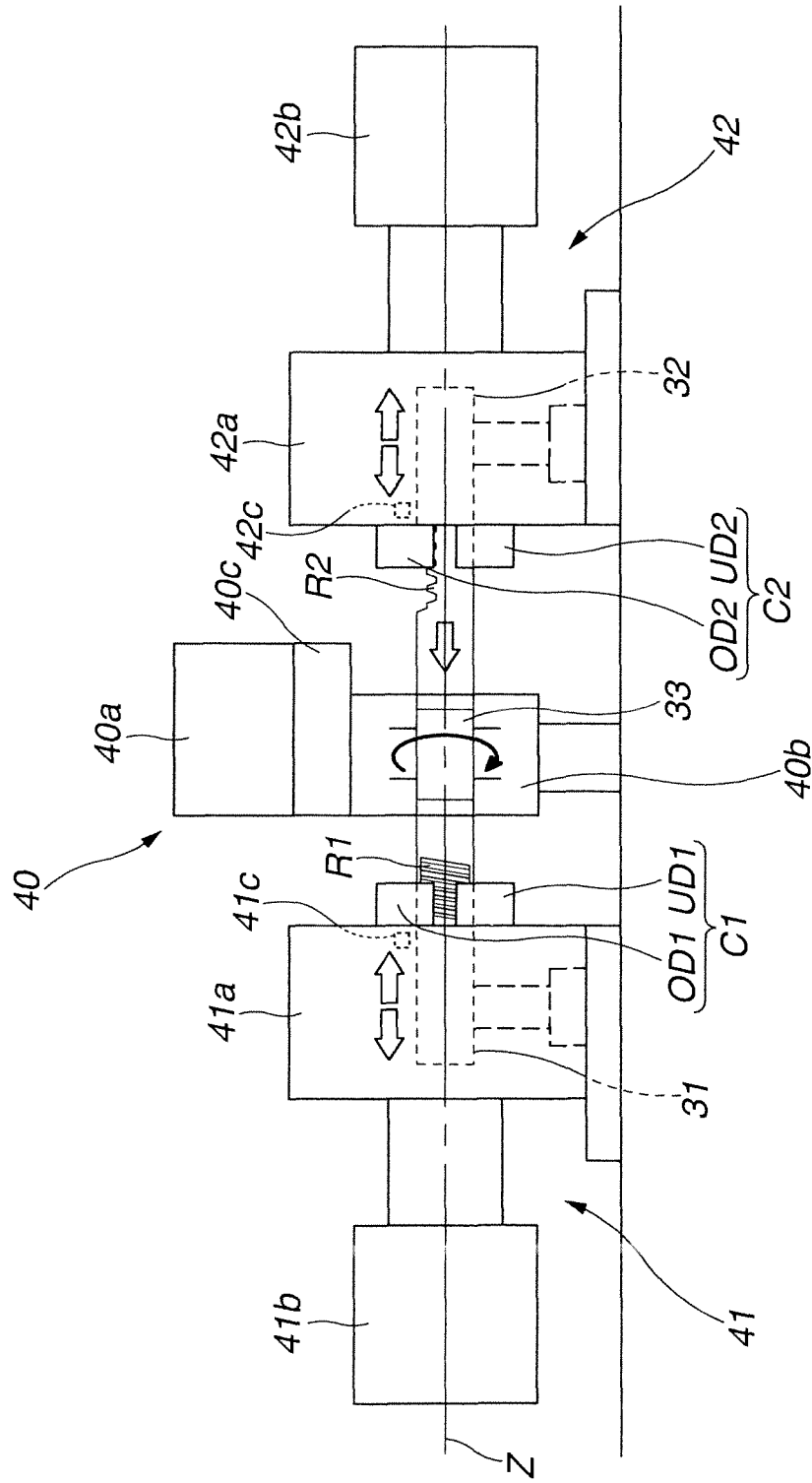
FIG. 9 is a schematic view of a production equipment by which the rack production method of the present invention is practically carried out.

In FIG. 9, there is schematically shown a production equipment that is used for carrying out the method of the present invention.

The production equipment shown comprises a rotating device 40 that rotates intermediate bar piece 33 at a given high speed, a first pressing device 41 that is located at a left side of rotating device 40 to press first bar piece 31 against a left end of intermediate bar piece 33, and a second pressing device 42 that is located at a right side of rotating device 40 to press second bar piece 32 against a right end of intermediate bar piece 33. These three devices 40, 41 and 42 are thus aligned with respect to the axis "Z" of rack 1 properly set in the production equipment.

Rotating device 40 comprises an electric motor 40a that produces a power for rotating intermediate bar piece 33, a rotor unit 40b that actually rotates intermediate bar piece 33 about its axis by using the power from electric motor 40a and a speed reducer 40c that is arranged between electric motor 40a and rotor unit 40b to transmit the rotation from electric motor 40a to rotor unit 40b while reducing the speed of the rotation. Rotor unit 40b may be, for example, a device that rotates intermediate bar piece 33 with the aid of rollers or shoes that hold the outer surface of intermediate bar piece 33.

As is seen from FIG. 9, first pressing device 41 comprises a first holding unit 41a that is equipped with the above-mentioned chuck C1 (or first chuck) for holding first bar piece 31, a first hydraulic power unit 41b that moves first chuck C1 rightward in the drawing toward rotating device 40 when operated, and a first position sensor 41c that is connected to first holding unit 41a to detect an axial position of first bar piece 31 held by first chuck C1.

Like first pressing device 41, second pressing device 42 comprises a second holding unit 42a that is equipped with the above-mentioned chuck C2 (or second chuck) for holding second bar piece 32, a second hydraulic power unit 42b that moves second chuck C2 leftward in the drawing toward rotating device 40 when operated, and a second position sensor 42c that is connected to second holding unit 42a to detect an axial position of second bar piece 32 held by second chuck C2.

As has been mentioned hereinabove, each chuck C1 or C2 is of a split type including a pair of jaw rods OD1 and UD1 (or OD2 and UD2).

Rotating device 40 and first and second pressing devices 41 and 42 are controlled by a known controller (or servomechanism) for carrying out the friction welding of the three bar pieces 31, 33 and 32. More specifically, with the work of the controller, the rotation speed and braking level of rotating device 40 are controlled, and with the work of the controller and first and second position sensors 41c and 42c, the axial movement of first and second chucks C1 and C2 and the pressing force of first and second bar pieces 31 and 32 against intermediate bar piece 33 are also controlled.

In the following, steps for carrying out the friction welding will be described in detail with the aid of the drawings, particularly FIG. 9.

First, first bar piece 31 is held by first chuck C1 of first holding unit 41a that has been set at a predetermined position. That is, as is seen from FIG. 11, first bar piece 31 is tightly put between the paired jaw rods OD1 and UD1 in such a manner that first rack teeth R1 of the bar piece 31 are meshed with positioning pins 50 (not shown in FIG. 11) possessed by jaw rod OD1 and semicylindrical portion B1 of the bar piece 31 is put in a V-shaped groove 51 formed in the other jaw rod UD1. With this, an angular position of first bar piece 31 relative to first chuck C1 is tightly set. More specifically, an angular position of first rack teeth forming portion T1 of first bar piece 31 is tightly set. Arrangement of positioning pins 50 of jaw rod OD1 relative to first rack teeth R1 of the bar piece 31 will be imaged from FIG. 13 that shows the angular positioning of second bar piece 32 relative to chuck C2.

Then, second bar piece 32 is held by second chuck C2 of second holding unit 42a that has been set at a predetermined position. That is, as is seen from FIG. 12, second bar piece 32 is tightly put between the paired jaw rods OD2 and UD2 in such a manner that second rack teeth R2 of the bar piece 32 are meshed with positioning pins 50 (not shown in FIG. 12) possessed by jaw rod OD2 and elongate roof portion B2 of the bar piece 32 is snugly put in a V-shaped groove 52 formed in the other jaw rod UD2. With this, an angular position of second bar piece 32 relative to second chuck C2 is tightly set. More specifically, an angular position of second rack teeth forming portion T2 of second bar piece 32 is tightly set. Arrangement of the positioning pins 50 of jaw rod OD2 relative second rack teeth R2 of the bar piece 32 will be well understood from FIG. 13.

Then, as is seen from FIGS. 9 and 10, intermediate bar piece 33 is set to rotor unit 40b of rotating device 40 and then rotated about its axis at a given high speed.

Then, first and second hydraulic power units 41b and 42b are energized for axially moving, through first and second chucks C1 and C2, first and second bar pieces 31 and 32 toward the rotating intermediate bar piece 33, more specifically, toward circular left and right end faces 33a and 33b of the rotating intermediate bar piece 33 respectively.

When respective circular right and left ends 31a and 32a of first and second bar pieces 31 and 32 are brought into contact with circular left and right end faces 33a and 33b of the rotating intermediate bar piece 33, the contacting portions start to generate a high frictional heat. When the contacting portions show a predetermined high temperature, the rotation of intermediate bar piece 33 is instantly stopped. Upon this, welding between the right end 31a of first bar piece 31 and the left end 33a of intermediate bar piece 33 as well as welding between the left end 32a of second bar piece 32 and the right end 33b of intermediate bar piece 33 are effected by the generated high heat. Until the time when the welding is sufficiently made, first and second bar pieces 31 and 32 are kept pressed against intermediate bar piece 33 with a given force by the work of first and second hydraulic power units 41b and 42b.

With the above-mentioned steps, a rough rack 1 as shown in FIG. 14 is produced. As shown, the rough rack 1 just produced has ugly burrs 1x around the welded portions.

The ugly burrs 1x are then removed through a known finishing method. With this, a finished rack 1 is produced as is seen from FIG. 15. Due to removal of the burrs 1x, the two welded portions is and 1b of rack 1 are smoothed, which reduces a stress that would be applied to such portions 1a and 1b under practical use of rack 1.

In the following, advantages provided by the first embodiment of the present invention will be itemized.

Due to employment of intermediate bar piece 33, the joining of the three bar pieces 31, 32 and 33 through the friction welding is achieved by only turning intermediate bar piece 33. That is, it is not necessary to turn first and second bar pieces 31 and 32 that have thereon first and second rack teeth R1 and R2 respectively. Thus, the intersection angle "θ" between first and second rack teeth R1 and R2 can be stably and assuredly kept even under rotation of intermediate bar piece 33, which eliminates an additional machining that would be applied to the rack teeth R1 and R2 if the intersection angle "A" is changed due to the rotation of intermediate bar piece 33.

Before making the friction welding, first and second bar pieces 31 and 32 are tightly held by respective first and second chucks C1 and C2 in such a manner as to allow the two bar pieces 31 and 32 to show the angular displacement of "θ" therebetween, and then, the friction welding is carried out by turning only the intermediate bar piece 33. This method is quite effective for eliminating or at least minimizing a deviation of the predetermined relative angular displacement of "θ".

For holding first and second bar pieces 31 and 32 by respective chucks C1 and C2, the imaginary elongate planes GF1 and GF2 provided by the bar pieces 31 and 32 are used as a reference for positioning. Since such planes GF1 and GF2 have a high positioning accuracy, the relative angular displacement of "θ" between the two bar pieces 31 and 32 can have a high accuracy.

Furthermore, since the imaginary elongate planes GF1 and GF2 provided by the bar pieces 31 and 32 are used as a reference for setting the relative angular displacement of "θ" between the two bar pieces 31 and 32, the engagement between first pinion P1 and first rack teeth R1 as well as the engagement between second pinion P2 and second rack teeth R2 are improved in meshing accuracy.

Furthermore, in the friction welding, the rotation speed of rotating device 40 and the pressing force of first and second hydraulic power units 41b and 42b are controlled by the controller (or servomechanism) and at the same time, the movement of first and second chucks C1 and C2 is controlled by the controller and first and second position sensors 41c and 42c. Thus, the friction welding between each of first and second bar pieces 31 and 32 and intermediate bar piece 33 can be accurately made. That is, dimensional errors of the produced rack 1 in the axial direction are suppressed or at least minimized. More specifically, the frictional welding can be sufficiently and equally made in the two welded portions 1a and 1b of the rack 1.

Furthermore, due to usage of two pressing units 41 and 42 for pressing first and second bar pieces 31 and 32 against intermediate bar piece 33, the pressing force with which first bar piece 31 is pressed against intermediate bar piece 33 as well as the other pressing force with which second bar piece 32 is pressed against intermediate bar piece 33 are much effectively controlled. Thus, the friction welding at the two welded portions 1a and 1b of the rack 1 is effectively made.

In the following, another method of producing the rack 1', which is a second embodiment of the present invention, will be described with reference to FIGS. 16 and 17.

Since the method of the second embodiment is similar to the above-mentioned first embodiment, only part or portion that is different from that of the first embodiment will be explained in the following.

In this second embodiment, a thin circular piece 33' is used in place of the above-mentioned intermediate bar piece 33 that is used in the first embodiment.

Figure 16:
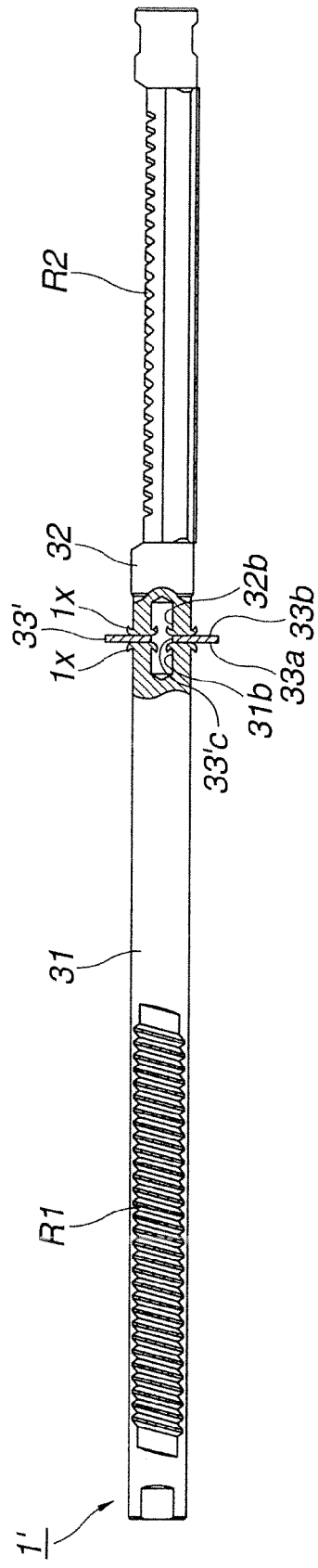
FIG. 16 is a view corresponding to FIG. 14, but showing a rack produced through a rack production method of a second embodiment of the present invention.
Figure 17:
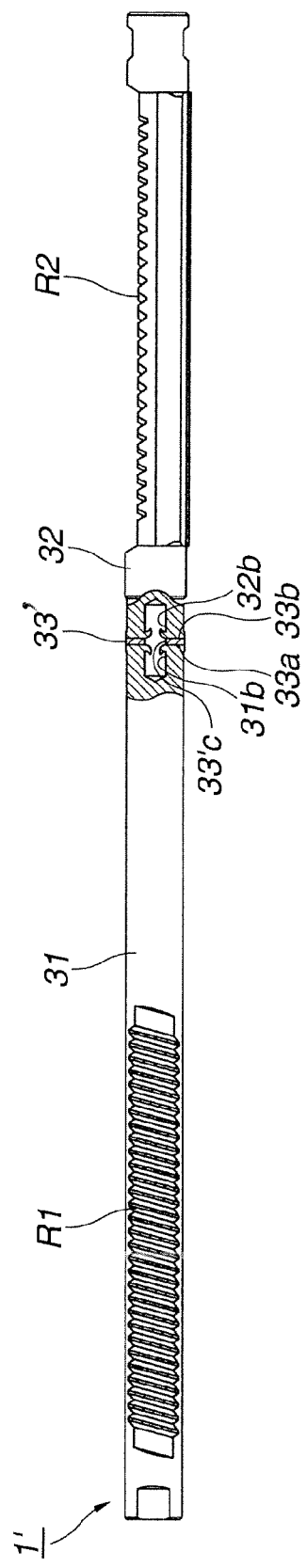
FIG. 17 is a view similar to FIG. 16, but showing a condition in which ugly burrs have been removed from the rack of FIG. 16.

As shown in FIG. 16, the thin circular piece 33' has an outer diameter larger than that of first and second bar pieces 31 and 32 and is formed with a circular opening 33'c of which diameter is the same as that of blind bores 31b and 32b of first and second bar pieces 31 and 32. The thickness of thin circular piece 33' is determined so as to allow the rotating device 40 (see FIG. 9) to stably rotate the thin circular piece 33'.

For joining these three pieces 31, 32 and 33' by the friction welding, substantially same steps as those of the above-mentioned first embodiment are carried out.

That is, first bar piece 31 (see FIG. 9) is held by first chuck C1, second bar piece 32 is held by second chuck C2, and thin circular piece 33' is set to rotating device 40 and rotated about its center at a given high speed. Then first and second bar pieces 31 and 32 are moved toward the rotating thin circular piece 33' and brought into contact with left and right faces of the rotating piece 33' respectively. Upon this, a high frictional heat is generated at the contacting portions, so that welding between first bar piece 31 and the left face 33'a of thin circular piece 33' and welding between second bar piece 32 and the right face 33'b of thin circular piece 33' are effected by the generated high heat. Until the time when the welding is sufficiently made, first and second bar pieces 31 and 32 are kept pressed against thin circular piece 33' with a given force by the work of first and second hydraulic power units 41b and 42b.

With the above-mentioned steps, a rough rack 1' as shown in FIG. 16 is produced. As shown, the rough rack 1' just produced has ugly burrs 1x around the welded portions.

The ugly burrs 1x are then removed together with a radially projected part of thin circular piece 33' through a known finishing method. With this, a finished rack 1' is produced as is seen from FIG. 17. Due to removal of the burrs 1x, the two welded portions (no numerals) of rack 1' are smoothed, which reduces a stress that would be applied to such welded portions under practical use of rack 1'.

In the following, advantages provided by the method of the second embodiment of the invention will be itemized.

Also in this second embodiment, the advantages provided by the above-mentioned first embodiment are almost obtained.

Furthermore, in this second embodiment, usage of the thin circular piece 33' brings about a light weight construction of rack 1'. In other words, the thin circular piece 33' (and the above-mentioned intermediate bar piece 33 of the first embodiment) is a so-called stopgap member that is used for suppressing a mutual rotation between first and second bar pieces 31 and 32. More specifically, the piece 33' or 33 is not a member that can play an important part of rack 1' or 1.

For carrying out the friction welding, the thin circular piece 33' of which diameter is larger than that of first and second bar pieces 31 and 32 is used. Accordingly, the friction welding between each of first and second bar pieces 31 and 32 and thin circular piece 33' is easily and assuredly made. Due to the larger size of the piece 33', a displacement between first and second bar pieces 31 and 32 in a radial direction can be suitably compensated by the piece 33' when the displacement is not so large.

The present invention is not limited to the above-mentioned first and second embodiments. That is, the shape of first and second bar pieces 31 and 32, the relative angle "θ" between these bar pieces 31 and 32 and the size and shape of first and second rack teeth R1 and R2 may be changed or adjusted in accordance with specifications of an electric power steering device to which the rack of the invention is practically applied.

Furthermore, if desired, the pressing force for pressing first and second bar pieces 31 and 32 against intermediate bar piece 33 (or thin circular piece 33') may be produced by only one of first and second pressing devices 41 and 42. That is, for example, first hydraulic power unit 41b (see FIG. 9) may be removed from first pressing device 41. In this case, a modification is so made that the pressing force produced by second hydraulic power unit 42b causes a pressing of the piece 33 (or 33') against first bar piece 31 as well as a pressing of second bar piece 32 against the piece 33 (or 33'). Of course, in this modification, the production equipment for producing the rack 1 or 1' can be simplified and downsized.

Furthermore, if desired, for achieving the friction welding of the three pieces 31, 32 and 33 (or 33'), first and second bar pieces 31 and 32 may be rotated keeping intermediate bar piece 33 (or thin circular piece 33') stationary. In this case, once the friction heat produced at the contacting portions 1a and 1b becomes sufficient, the rotation of first and second bar pieces 31 and 32 is instantly stopped and just after this stopping, the relative angle between these two bar pieces 31 and 32 is adjusted to "θ".

Furthermore, for accurately aligning the three pieces 31, 32 and 33 before the friction welding in case of the first embodiment, first and second positioning pins (not shown) may be used. That is, as will be imaged or understood from FIG. 14, the first positioning pin extends in and between blind bore 31b of first bar piece 31 and through bore 33c of intermediate bar piece 33 and the second positioning pin extends in and between blind bore 32b of second bar piece 32 and through bore 33c of intermediate bar piece 33. Of course, in this case, such first and second positioning pins are left in a finished rack 1.

The entire contents of Japanese Patent Application 2012-191074 filed Aug. 31, 2012 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A method of producing a rack for use in an electric power steering device of a vehicle, comprising:
   preparing a first bar piece that has first rack teeth adapted to be meshed with a first pinion directly driven by a steering wheel, a second bar piece that has second rack teeth adapted to be meshed with a second pinion driven by a steering assist electric motor and an intermediate piece that has one end to be welded to the first bar piece and the other end to be welded to the second bar piece;
   aligning the first bar piece, the intermediate piece and the second bar piece in order along a common axis;
   carrying out a first process in which the first and second bar pieces are stationarily held while having a predetermined intersection angle between the first rack teeth on the first bar piece and the second rack teeth on the second bar piece; and
   carrying out a second process in which each of the first and second bar pieces and the intermediate piece are brought into contact with each other at mutually facing ends and subjected to a relative rotation therebetween for friction welding, to thereby join the first bar piece, the intermediate piece and the second bar piece together by the friction welding,
   wherein the first process includes a step for fixing the first and second bar pieces to first and second pressing devices in such a manner as to have a relative angular displacement therebetween, and
   wherein the second process includes a step for rotating the intermediate piece at a given high speed about the common axis relative to the fixed first and second bar pieces.

2. The method as claimed in claim 1, in which in the first process, for angularly positioning the first and second bar pieces, the first rack teeth and the second rack teeth are used as reference planes.

3. The method as claimed in claim 2, in which in the first process, for angularly positioning the first and second bar pieces, a generally middle portion of the first rack teeth in the common axis and a generally middle portion of the second rack teeth in the common axis are used as the reference planes.

4. The method as claimed in claim 1, in which in the first process, the first bar piece is stationarily held at an angle about the common axis that is different from an angle at which the second bar piece is stationarily held.

5. The method as claimed in claim 4, in which,
   the first process includes a step for fixing the intermediate piece to a holding device.

6. The method as claimed in claim 1, in which the intermediate piece is a thin circular piece having a diameter that is larger than that of the first and second bar pieces.

7. The method as claimed in claim 6, further comprising a third process in which after completion of the second process, a radially projected part of the thin circular piece beyond outer surfaces of the first and second bar pieces is removed to provide welded portions with smoothly rounded outer surfaces.

8. The method as claimed in claim 1, in which the first and second bar pieces are different in diameter.

9. The method as claimed in claim 8, in which:
   the mutually facing ends portions of the first bar piece and the intermediate piece, which are to be joined by the friction welding, are identical in diameter and shape, and
   the mutually facing ends portions of the second bar piece and the intermediate piece, which are to be joined by the friction welding, are identical in diameter and shape.

10. The method as claimed in claim 1, in which:
    the intermediate piece is formed with an axially extending through bore;
    the first bar piece is formed at one of the ends of the intermediate piece with a blind bore which is mated with one end of the axially extending through bore of the intermediate piece upon completion of the friction welding; and
    the second bar piece is formed at the other end of the intermediate piece with a blind bore which is mated with another end of the axially extending through bore of the intermediate piece upon completion of the friction welding.

11. The method as claimed in claim 1, in which each of the first bar piece, the second bar piece and the intermediate piece is made of untempered steel.

12. The method as claimed in claim 1, in which in the second process, the first and second bar pieces are permitted to move axially relative to the intermediate piece in order to compensate for a lack of an axial length of the rack at the mutually facing ends of the first and second bar pieces and the intermediate piece when the first and second bar pieces and the intermediate piece are subjected to the friction welding.

* * * * *